(12) United States Patent
Tanaka

(10) Patent No.: US 9,643,457 B2
(45) Date of Patent: May 9, 2017

(54) PNEUMATIC TIRE

(71) Applicant: Sumitomo Rubber Industries, Ltd., Kobe-shi, Hyogo (JP)

(72) Inventor: Kaori Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 86 days.

(21) Appl. No.: 14/710,818

(22) Filed: May 13, 2015

(65) Prior Publication Data

US 2015/0352905 A1 Dec. 10, 2015

(30) Foreign Application Priority Data

Jun. 4, 2014 (JP) .................................. 2014-116062

(51) Int. Cl.
*B60C 11/04* (2006.01)
*B60C 11/12* (2006.01)
(Continued)

(52) U.S. Cl.
CPC ............ *B60C 11/1272* (2013.04); *B60C 5/00* (2013.01); *B60C 11/0306* (2013.04); *B60C 11/125* (2013.04); *B60C 11/13* (2013.01); *B60C 2011/0344* (2013.04); *B60C 2011/0346* (2013.04); *B60C 2011/0348* (2013.04); *B60C 2011/0351* (2013.04)

(58) Field of Classification Search
CPC ........... B60C 11/125; B60C 2011/0348; B60C 2011/0351; B60C 2011/0344; B60C 2011/0346
See application file for complete search history.

(56) References Cited

U.S. PATENT DOCUMENTS

2012/0305155 A1   12/2012   Hamanaka
2015/0343849 A1*  12/2015   Tanaka ................ B60C 11/1323
                                                        152/209.19

FOREIGN PATENT DOCUMENTS

EP         841199 A2 *   5/1998
EP      2 586 626 A1     5/2013
                    (Continued)

OTHER PUBLICATIONS

Machine translation for Japan 2012-153157 (no date).*
Machine translation for Japan 2000-158916 (no date).*

*Primary Examiner* — Steven D Maki
(74) *Attorney, Agent, or Firm* — Birch, Stewart, Kolasch & Birch, LLP

(57) ABSTRACT

A pneumatic tire comprises a tread portion provided with a center main groove on the tire equator and a shoulder main groove on each side of the center main groove. The center main groove and the shoulder main groove extend zigzag and continuously in the tire circumferential direction so that a crown land portion defined between the center main groove and the shoulder main groove has an axial width alternately increasing and decreasing along the tire circumferential direction. The crown land portion is provided with a shallow crown circumferential groove extending zigzag and continuously in the tire circumferential direction, and crown sipes extending from the center main groove to the shoulder main groove across the shallow crown circumferential groove. Zigzag apexes of the shallow crown circumferential groove are respectively positioned between the crown sipes.

12 Claims, 5 Drawing Sheets

(51) Int. Cl.
*B60C 11/13* (2006.01)
*B60C 5/00* (2006.01)
*B60C 11/03* (2006.01)

(56) References Cited

FOREIGN PATENT DOCUMENTS

| | | | |
|---|---|---|---|
| JP | 2000-158916 A | * | 6/2000 |
| JP | 2012-153157 A | * | 8/2012 |
| JP | 2013-189128 A | | 9/2013 |

* cited by examiner

PNEUMATIC TIRE

BACKGROUND OF THE INVENTION

The present invention relates to a pneumatic tire, more particularly to a tread pattern suitable for heavy duty tires capable of improving wet performance without sacrificing wear resistance and uneven wear resistance.

In order to improve wet performance of a pneumatic tire, the tread portion is usually provided with wide circumferential grooves to provide good drainage.

In the heavy duty tires such as truck/bus tires, however, due to such wide circumferential grooves, the rigidity of land portions or ground contacting portions between the wide circumferential grooves is liable to become insufficient for maintaining the wear resistance and uneven wear resistance, therefore, a rib-type tread pattern is usually employed in the heavy duty tires designed for use on mainly dry asphalt roads. In order to further improve wet performance of such tire, if land portions or ribs are provided with lateral grooves, the rigidity is decreased and wear is liable to occur.

SUMMARY OF THE INVENTION

It is therefore, an object of the present invention to provide a pneumatic tire, in which, by specially arranging circumferential grooves and specially configured sipes, wet performance is improved without sacrificing the wear resistance and uneven wear resistance.

According to the present invention, a pneumatic tire comprises:
a tread portion provided with a center main groove disposed on the tire equator and a shoulder main groove disposed on each side of the center main groove, wherein the center main groove and the shoulder main groove extend zigzag and continuously in the tire circumferential direction so that a crown land portion defined between the center main groove and the shoulder main groove has an axial width alternately increasing and decreasing along the tire circumferential direction, and
the crown land portion is provided with
a single shallow crown circumferential groove having a depth less than a depth of the center main groove and extending zigzag and continuously in the tire circumferential direction, and
a plurality of crown sipes extending from the center main groove to the shoulder main groove across the shallow crown circumferential groove so that
zigzag apexes of the shallow crown circumferential groove are respectively positioned between the crown sipes.

Further, the pneumatic tire according to the present invention may be provided with the following features (1)-(9):
(1) the crown sipes extend from respective axially-outwardly-protruding zigzag apexes of an edge of the center main groove to respective axially-inwardly-protruding zigzag apexes of an edge of the shoulder main groove;
(2) the crown sipe is provided on the radially outside of its main part having a smaller width with a widened outermost part having a larger width;
(3) at the tread surface of the tread portion, the width of the shallow crown circumferential groove is less than the width of the widened outermost part;
(4) the angle of the center main groove with respect to the tire circumferential direction is less than the angle of the shallow crown circumferential groove with respect to the tire circumferential direction;
(5) each of the crown sipes has a v-shaped configuration having a bent position at which the shallow crown circumferential groove intersects;
(6) the crown sipes are inclined at 55 to 85 degrees with respect to the tire circumferential direction;
(7) a minimum axial width of the crown land portion is 87% to 97% of a maximum axial width of the crown land portion;
(8) the depth of the crown sipes are 80% to 100% of the depth of the center main groove;
(9) the depth of the widened outermost part is 5% to 15% of the depth of the center main groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with the accompanying drawings.

According to the present invention, a pneumatic tire 1 comprises a tread portion 2, a pair of axially spaced bead portions each with a bead core therein, a pair of sidewall portions extending between the tread edges Te and the bead portions, a carcass extending between the bead portions, a tread reinforcing cord layers disposed radially outside the carcass in the tread portion as usual.

Figure 1:
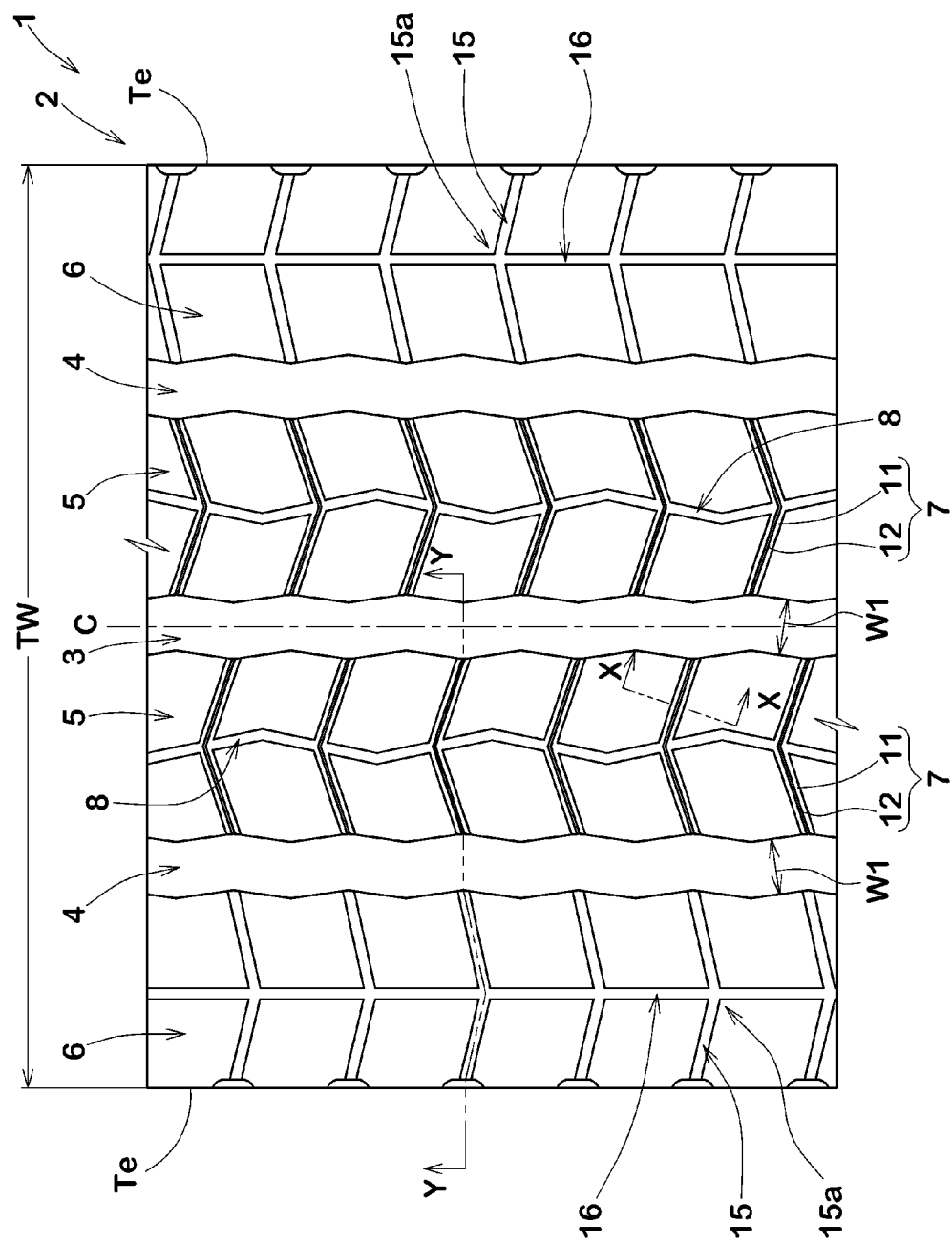
FIG. 1 is a developed view of a part of the tread portion of a pneumatic tire as an embodiment of the present invention.

FIG. 1 shows a part of the tread portion 2 of an embodiment of the present invention which is designed as a heavy duty tire for truck, bus and the like.

The tread portion 2 is provided with main grooves extending continuously in the tire circumferential direction. In this embodiment, three main grooves are provided, therefore, the tread pattern is based on a four-rib pattern.

The main grooves include a center main groove 3 disposed on the tire equator C and a shoulder main groove 4 disposed on each side of the center main groove 3.

By the main grooves 3 and 4, the tread portion 2 is axially divided into a crown land portion 5 between the center main groove 3 and each shoulder main groove 4, and a shoulder land portion 6 between each shoulder main groove 4 and the adjacent tread edge Te.

Figure 2:
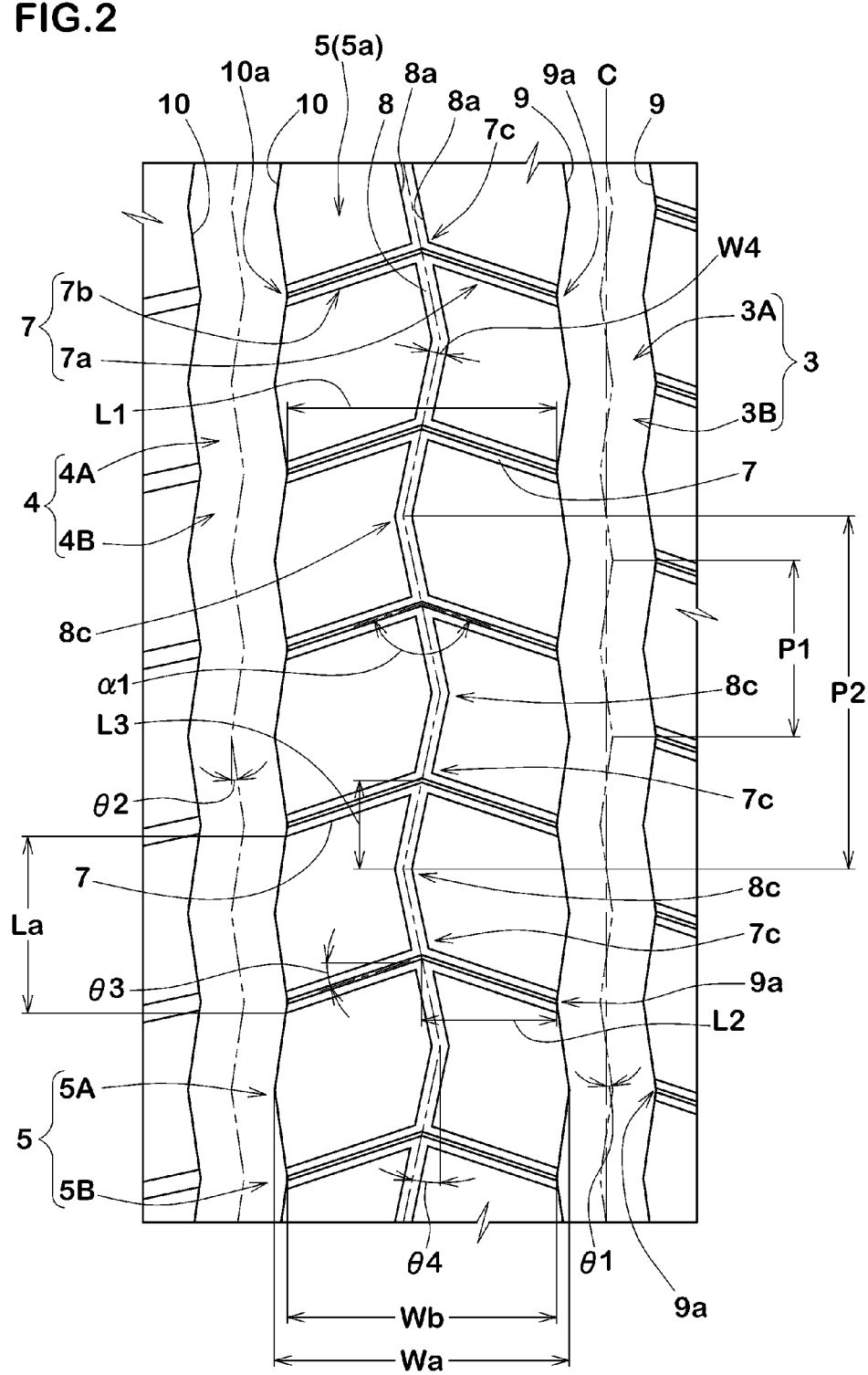
FIG. 2 is an enlarged view showing a part of a crown land portion between a center main groove and a shoulder main groove in FIG. 1.

The center main groove 3 extends zigzag. As shown in FIG. 2, the center main groove 3 comprises first groove segments 3A and second groove segments 3B which are alternately arranged in the tire circumferential direction and inclined with respect to the tire circumferential direction reversely to each other in order that water existing between the road surface and land portions on both sides of the center main groove 3 can be introduced into the center main groove 3.

Preferably, the inclination angle $\theta 1$ of the center main groove 3 (segments 3A and 3B) with respect to the tire circumferential direction is set in a range of from 5 to 15 degrees. If more than 15 degrees, there is a possibility that the resistance to flow of water in the center main groove 3 is increased, and the drainage performance is deteriorated. If less than 5 degrees, it becomes difficult to introduce water into the center main groove 3.

In this example, the first groove segments 3A and the second groove segments 3B have substantially the same circumferential length in order to expedite the flow of water in the center main groove 3 and also to even in the tire circumferential direction the rigidity variations occurring in the vicinity of the center main groove 3 so as to improve uneven wear resistance.

The shoulder main groove 4 extends zigzag. As shown in FIG. 2, the shoulder main groove 4 comprises first groove segments 4A and second groove segments 4B which are alternately arranged in the tire circumferential direction and inclined with respect to the tire circumferential direction reversely to each other.

The inclination angle $\theta 2$ of the shoulder main groove 4 with respect to the tire circumferential direction is preferably set in a range of from 5 to 15 degrees for the same reasons as above.

In this example, the first groove segments 4A and the second groove segments 4B have substantially the same circumferential length for the same reasons as above.

The widths W1 and depths D1 of the center main groove 3 and shoulder main grooves 4 may be arbitrarily determined. But, the width W1 of each of the main grooves 3 and 4 is preferably set in a range of from 3% to 12% of the tread width TW. The depth D1 of each of the main grooves 3 and 4 is preferably set in a range of from 15 to 25 mm.

As shown in FIG. 2, the center main groove 3 and the shoulder main grooves 4 have substantially same zigzag pitches P1.

The zigzag phase of each shoulder main groove 4 is circumferentially shifted from the zigzag phase of the center main groove 3 by about one half of a zigzag pitch. Accordingly, the axial width of the crown land portion 5 alternately increases and decreases along the tire circumferential direction.

As a result, the crown land portion 5 comprises maximum-width parts 5A having a maximum axial width Wa and minimum-width parts 5B having a minimum axial width Wb, which are alternately arranged in the tire circumferential direction.

As the maximum-width parts 5A are arranged at substantially regular intervals in the tire circumferential direction, the rigidity in the tire axial direction of the crown land portion 5 as a whole is increased, and the wear resistance can be improved. In order that the uneven wear resistance can be maintained, the minimum axial width Wb is preferably set to be not less than 87%, more preferably not less than 90% of the maximum axial width Wa.

The minimum axial width Wb is preferably set to be not more than 97%, more preferably not more than 94% of the maximum axial width Wa in order to improve wet performance.

The crown land portion 5 is provided with a single shallow crown circumferential groove 8 extending zigzag and continuously in the tire circumferential direction, and a plurality of crown sipes 7 extending from the center main groove 3 to the adjacent shoulder main groove 4 across the groove 8.

As shown in FIGS. 1 and 2, one of axial ends of each crown sipe 7 is opened at one of axially outwardly protruding zigzag apexes 9a of an edge 9 of the center main groove 3, and the other axial end is opened at one of axially inwardly protruding zigzag apexes 10a of the axially inner edge 10 of the shoulder main groove 4.

Figure 3:
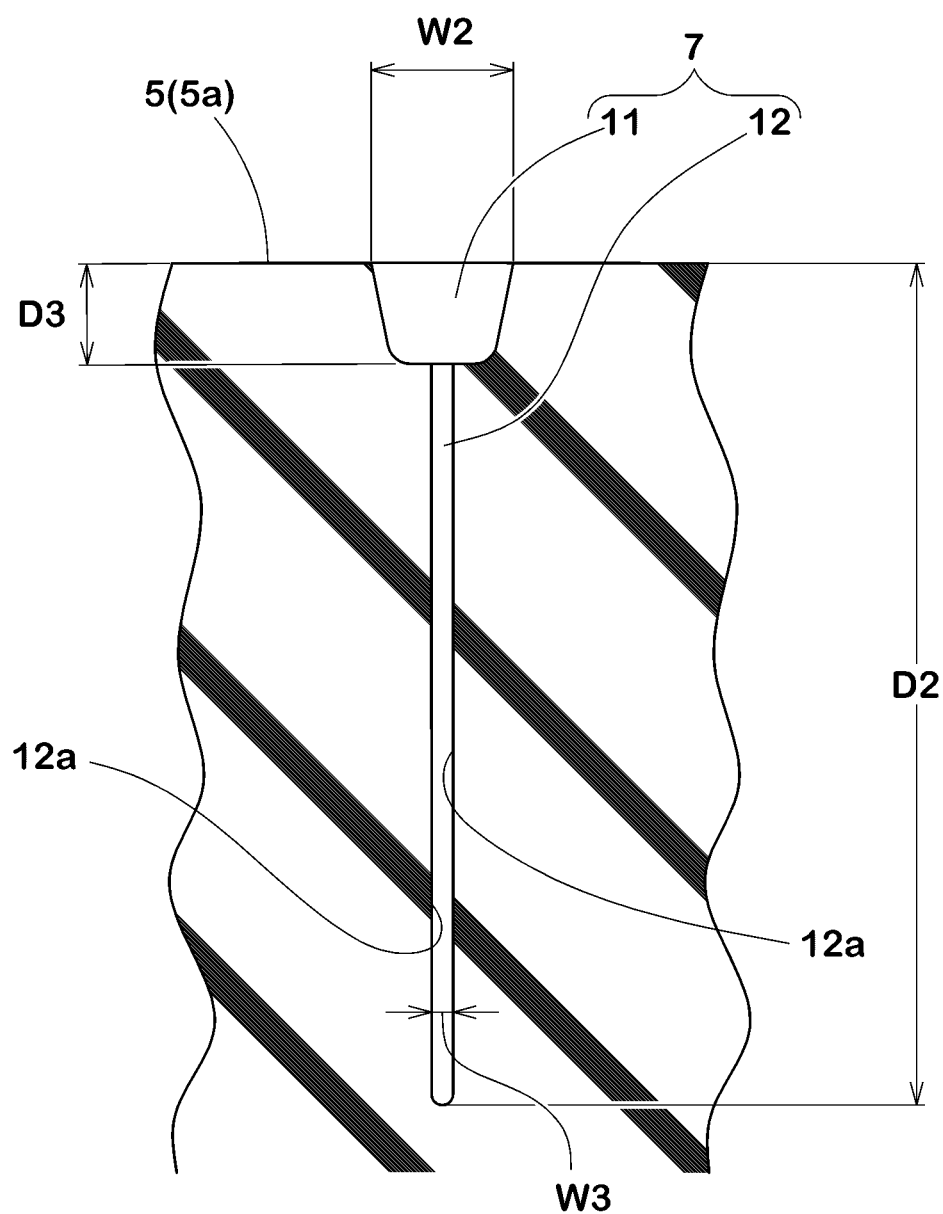
FIG. 3 is a cross sectional view taken along line X-X in FIG. 1.

In this embodiment, as shown in FIG. 3, each crown sipe 7 is provided on the radially outside of its main part 12 having a smaller width W3 with a widened outermost part 11 having a larger width W2 to provide a drainage function to the crown sipe 7.

For that purpose, the width W2 of the widened outermost part 11 is preferably set in a range of from 4% to 10% of the maximum axial width Wa of the crown land portion 5.

On the other hand, the main part 12 as a sipe has a width W3 in a range of from 0.2 to 1.2 mm.

The depth D3 of the widened outermost part 11 is less than the depth (D2-D3) of the main part 12. The depth D3 is preferably set in a range of not less than 5%, more preferably not less than 8%, and preferably not more than 15%, more preferably not more than 12% the depth D1 of the center main groove 3.

The overall depth D2 of the crown sipe 7 is preferably set in a range of not less than 80%, more preferably not less than 85%, and preferably not more than 100%, more preferably not more than 95% of the depth D1 of the center main groove 3. Therefore, in the ground contacting patch of the tire during running, the side walls 12a of the main part 12 support each other, which increase the apparent rigidity of the crown land portion 5 to thereby improve the resistance to overall wear and uneven/partial wear.

The widened outermost part 11 lead the water existing between the road surface and the crown land portion 5 to the main grooves 3 and 4.
Accordingly, the wet performance can be improved without sacrificing the overall wear resistance and uneven wear resistance.

Each crown sipe 7 has a v-shaped configuration in its top view having a bent position 7c, and the crown sipe 7 is composed of an inside part 7a on the axially inside of the bent position 7c and an outside part 7b on the axially outside of the bent position 7c, which are inclined with respect to the tire axial direction reversely to each other.

The angle θ3 of the crown sipe 7 (inside part 7a and outside part 7b) with respect to the tire circumferential direction is preferably not less than 55 degrees, and not more than 85 degrees.

The angle α1 formed between the inside part 7a and the outside part 7b is preferably not more than 170 degrees, more preferably not more than 160 degrees, and preferably not less than 110 degrees, more preferably not less than 120 degrees.

When the crown land portion 5 is subjected to a lateral force, the side walls 12a of the main part 12 are engaged with each other like a continuous rib, and the rigidity in the tire axial direction is maintained, therefore, the wear resistance and uneven wear resistance can be maintained or improved.

Since the crown sipes 7 are connected to the zigzag apexes 9a and 10a, the drain path to the main grooves 3 and 4 becomes minimum, and drainage is expedited to improve the wet performance.
Further, in comparison with when connected to other positions than the zigzag apexes 9a and 10a, the angles of corners formed between the main grooves 3 and 4 and the crown sipes 7 become larger as a whole and the variations of the angles become smaller, therefore, wear starting from such corners can be reduced, and as a result, the wear resistance can be maintained or improved.
If the angle θ3 is less than 55 degrees, the angles of some of the above-mentioned corners are decreased and the rigidity is decreased. As a result, uneven wear is liable to start from such corners. If the angle θ3 is more than 85 degrees, it becomes difficult for the side walls 12a to engage with each other. As a result, wear is liable to occur.

It is preferable that the bent position 7c is disposed in a central region in the tire axial direction of the crown land portion 5 to balance the rigidity on both sides so as not to deteriorate the wear resistance and uneven wear resistance. Therefore, as shown in FIG. 2, the axial distance L2 between the bent position 7c of each crown sipe 7 and the zigzag apex 9a at which the inside part 7a thereof is opened, is preferably set in a range of from 45% to 55% of the minimum axial width Wb of the crown land portion 5.

The shallow crown circumferential groove 8 comprises first groove segments and second groove segments which are alternately arranged in the tire circumferential direction and inclined with respect to the tire circumferential direction reversely to each other, and in this example, the first groove segments and the second groove segments have substantially the same circumferential length.

The angle θ4 of the shallow crown circumferential groove 8 (first groove segments and second groove segments) is preferably set in a range of from 8 to 20 degrees with respect to the tire circumferential direction.
Preferably, the angle θ4 is more than the angle θ1 of the center main groove 3 with respect to the tire circumferential direction.

The width W4 of the shallow crown circumferential groove 8 is preferably set in a range of from 2% to 8% of the maximum axial width Wa of the crown land portion 5.
Preferably, the width W4 is set to be less than the width W2 of the widened outermost part 11.

Figure 4:
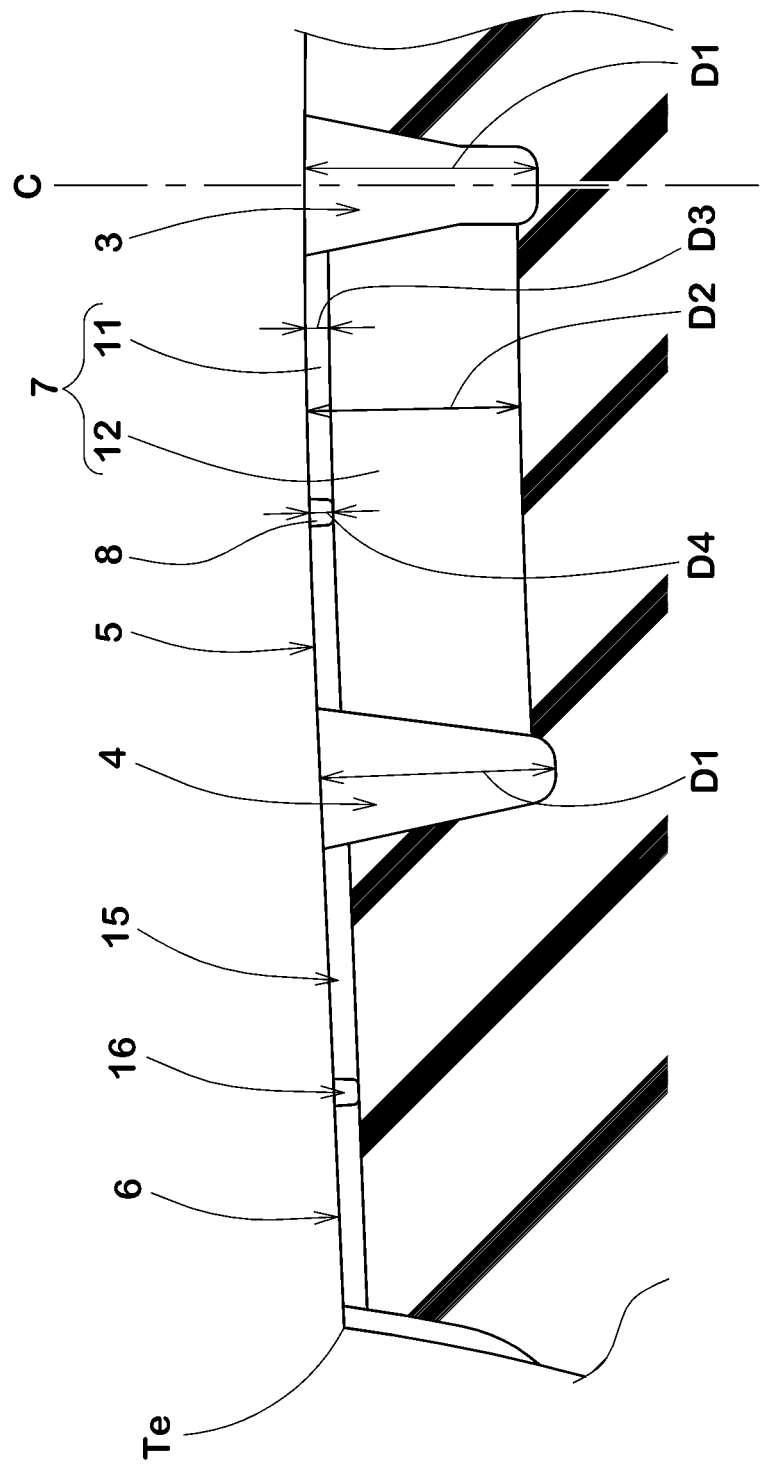
FIG. 4 is a cross sectional view taken along line Y-Y in FIG. 1.
Figure 5:
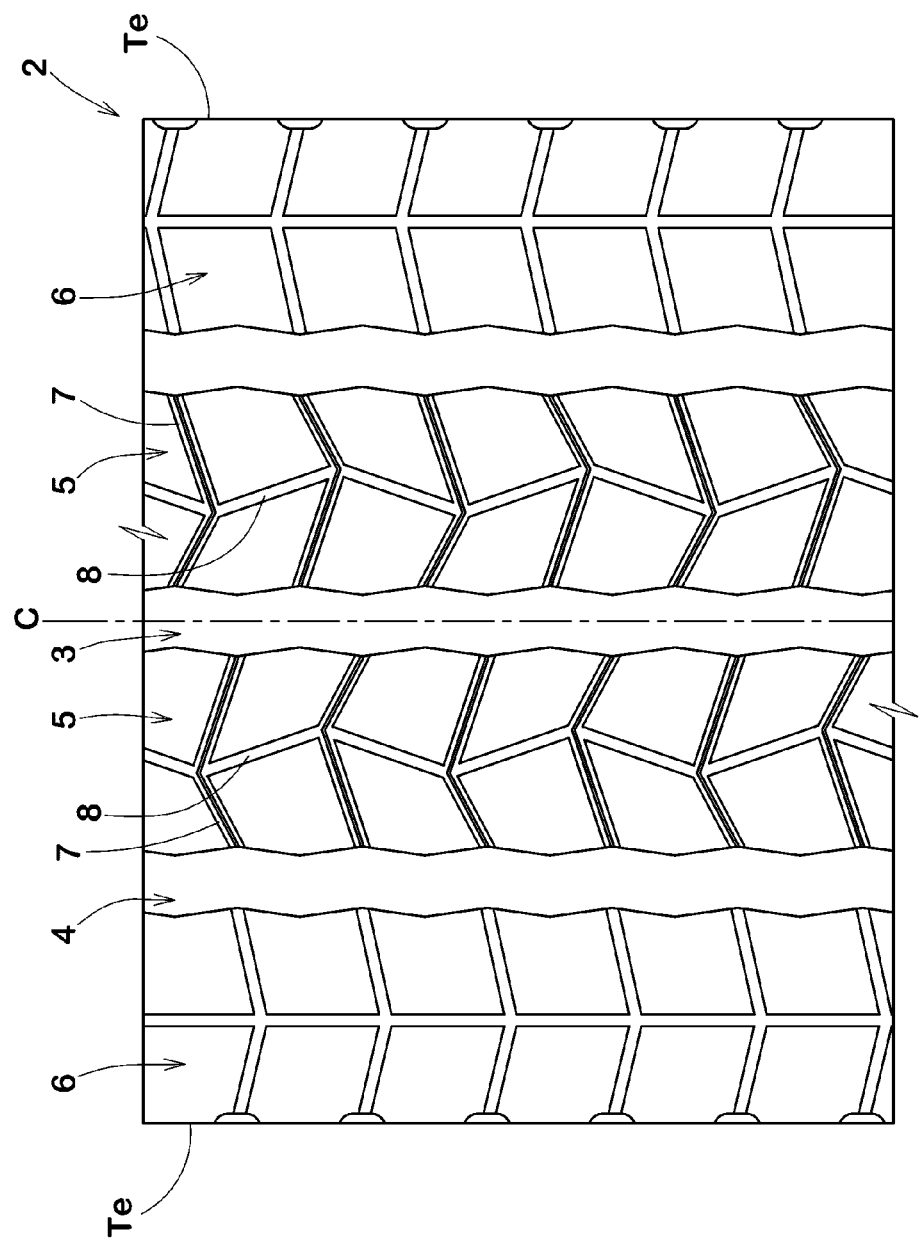
FIG. 5 is a developed partial view of the tread portion of a comparative example.

As shown in FIG. 4, the depth D4 of the shallow crown circumferential groove 8 is less than the depth D1 of the center main groove 3, and preferably set in a range of from 5% to 15% of the depth D1.

By setting the angle θ4 more than the angle θ1, water existing between the crown land portion 5 and the road surface can be effectively introduced into the shallow crown circumferential groove 8, and lead to the main grooves 3 and 4. If the angle θ4 is more than 20 degrees, the corners (at zigzag apexes 8c) formed between the first groove segments and second groove segments of the shallow crown circumferential groove 8 are decreased in the rigidity, and there is a possibility that the wear resistance is deteriorated. Further, there is a possibility that the drain resistance is increased.

By setting the depth D4 less than the depth D1, the rigidity of the crown land portion 5 is maintained. Therefore, it is possible to improve the drainage or wet performance without deteriorating the wear resistance.

By setting the width W4, the deterioration in the uneven wear resistance and wear resistance of the crown land portion can be avoided while preserving the drainage function.

In this embodiment, the shallow crown circumferential groove 8 intersects with the crown sipes 7 at their bent positions 7c to expedite water flow between the shallow crown circumferential groove 8 and the crown sipes 7 and thereby to improve the wet performance.

As shown in FIG. 2, the zigzag apexes 8c of the shallow crown circumferential groove 8 are respectively positioned between the circumferentially adjacent crown sipes 7 by setting one zigzag pitch P2 of the groove 8 two times one zigzag pitch P1 of the groove 3.

Preferably, the circumferential distance L3 from the bent position 7c (at widthwise center) of each crown sipe 7 to the adjacent zigzag apex 8c of the shallow crown circumferential groove 8 is set in a range of from 45% to 55% of the circumferential distance La between the crown sipes 7 in order to balance the rigidity of each block defined by the grooves 8 and 3/4 and the sipes 7 on both sides on the bent position 7c in the tire circumferential direction.
Thus, the rigidity variation is decreased, and the uneven wear resistance can be maintained or improved.
For that purpose, one zigzag pitch P2 of the shallow crown circumferential groove 8 is preferably set in a range of from 8% to 16% of the tread width TW.

As shown in FIG. 1, the above-mentioned shoulder land portion 6 defined between each shoulder main groove 4 and the adjacent tread edge Te is provided with
a plurality of shallow shoulder lateral grooves 15 extending from the shoulder main groove 4 to the tread edge Te, and a single shallow shoulder circumferential groove 16 extending continuously in the tire circumferential direction.
The widths (FIG. 1) and depths (FIG. 4) of the lateral grooves 15 and the circumferential groove 16 are set in the same ranges for the above-mentioned width W4 and depth D3 or D4, namely, the widths are preferably set in a range of from 2% to 8% of the maximum axial width Wa of the crown land portion 5, and the depths are preferably set in a range of not less than 5%, more preferably not less than 8%, and preferably not more than 15%, more preferably not more than 12% the depth D1 of the center main groove 3.

Each shallow shoulder lateral groove 15 has a v-shaped configuration in its top view having a bent position 15a to expedite water flow between the shallow shoulder circumferential groove 16 and the shallow shoulder lateral grooves 15.

The shallow shoulder circumferential groove 16 extends parallel with the tire circumferential direction to reduce the drain resistance.

Comparison Tests

Based on the tread pattern shown in FIG. 1, truck/bus tires of size 11R22.5 (rim size 22.5×8.25) were experimentally manufactured and tested for the wear resistance, uneven wear resistance and drainage performance.

Specifications of the test tires are listed in Table 1. Common specifications are as follows:
  tread width TW: 209 mm
  maximum axial width of crown land portion: 42.0 mm
  depths D1 of main grooves: 21.6 mm
  depth D2 of crown sipes: 17.0 mm
  depth D3 of widened outermost part: 2.2 mm
  width W2 of widened outermost part: 6% of Wa
  width W3 of main part: 0.6 mm
  width W4 of shallow crown circumferential groove: 6% of Wa
  depth D4 of shallow crown circumferential groove: 2.2 mm
  tire pressure: 830 kPa <Wear Resistance and Uneven Wear Resistance Test>

The test tires of the same kind were mounted on all wheels of a 2-D-wheel-type 10-ton truck with a load of 5 tons and run for 30000 km on dry asphalt roads.

Then, the rear tires were measured for the remaining depths of the center main groove and shoulder main grooves at eight circumferentially different measuring points to obtain the average tread wear. The results are shown in Table 1 by an index based on comparative example tire Ref. 1 being 100, wherein the larger the value, the better the wear resistance.

Further, the front tires were visually checked for uneven wear, and the uneven wear state was evaluated into five ranks. The test results are shown in Table 1, wherein the higher the rank number, the better the uneven wear resistance.

<Drainage Performance Test>

The test vehicle was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in table 1 by an index based on Comparative example tire Ref. 1 being 100, wherein the larger is better.

From the test results, it was confirmed that the pneumatic tires according to the present invention can be improved in the wear resistance, uneven wear resistance and drainage performance in a well balanced manner.

The invention claimed is:

1. A pneumatic tire comprising:
a tread portion provided with a center main groove disposed on the tire equator and a shoulder main groove disposed on each side of the center main groove,
wherein the center main groove and the shoulder main groove extend zigzag and continuously in the tire circumferential direction so that a crown land portion defined between the center main groove and the shoulder main groove has an axial width alternately increasing and decreasing along the tire circumferential direction,
wherein the crown land portion is provided with a single shallow crown circumferential groove having a depth less than a depth of the center main groove and extending zigzag and continuously in the tire circumferential direction, and a plurality of crown sipes extending from the center main groove to the shoulder main groove across the shallow crown circumferential groove,
wherein the shallow crown circumferential groove is made up of first groove segments and second groove segments which are alternately arranged in the tire circumferential direction and inclined with respect to the tire circumferential direction reversely to each other, and the first groove segments and the second groove segments have substantially same circumferential lengths,
wherein the first groove segments and the second groove segments form zigzag apexes,
wherein each crown sipe has a V-shaped configuration having a single bent position, and each crown sipe is made up of an inside part on the axially inside of the bent position and an outside part on the axially outside of the bent position, which are inclined with respect to the tire axial direction reversely to each other, and
wherein one of the zigzag apexes of the shallow crown circumferential groove is disposed between every two of the circumferentially adjacent crown sipes.

2. The pneumatic tire according to claim 1, wherein the crown sipes extend from respective axially-outwardly-protruding zigzag apexes of an edge of the center main groove to respective axially-inwardly-protruding zigzag apexes of an edge of the shoulder main groove.

3. The pneumatic tire according to claim 2, wherein the crown sipe is provided on the radially outside of its main part having a smaller width with a widened outermost part having a larger width.

TABLE 1

|  | Tire | | | | | | | | | |
| --- | --- | --- | --- | --- | --- | --- | --- | --- | --- | --- |
|  | Ref. 1 | Ex. 1 | Ex. 2 | Ex. 3 | Ex. 4 | Ex. 5 | Ex. 6 | Ex. 7 | Ex. 8 | Ex. 9 |
| tread (FIG. No.) | 5 | 1 | 1 | 1 | 1 | 1 | 1 | 1 | 1 | 1 |
| angle θ3 (deg.) *1 | 70 | 70 | 50 | 55 | 85 | 87 | 70 | 70 | 70 | 70 |
| width ratio Wb/Wa (%) | 92 | 92 | 92 | 92 | 92 | 92 | 83 | 87 | 97 | 100 |
| wear resistance | 100 | 115 | 110 | 110 | 112 | 110 | 110 | 112 | 115 | 110 |
| uneven wear resistance | 3 | 5 | 4 | 5 | 4 | 4 | 4 | 4 | 5 | 5 |
| drainage | 100 | 100 | 98 | 100 | 99 | 98 | 98 | 100 | 98 | 97 |

*1) The angle of the inside part and the angle of the outside part of the crown sipe had the same absolute value θ3.

4. The pneumatic tire according to claim 1, wherein the crown sipe is provided on the radially outside of its main part having a smaller width with a widened outermost part having a larger width.

5. The pneumatic tire according to claim 4, wherein the depth of the widened outermost part is 5% to 15% of the depth of the center main groove.

6. The pneumatic tire according to claim 4, wherein at the tread surface of the tread portion, the width of the shallow crown circumferential groove is less than the width of the widened outermost part.

7. The pneumatic tire according to claim 6, wherein the depth of the widened outermost part is 5% to 15% of the depth of the center main groove.

8. The pneumatic tire according to claim 1, wherein the shallow crown circumferential groove intersects the crown sipes at the bent positions.

9. The pneumatic tire according to claim 1, wherein the crown sipes are inclined at 55 to 85 degrees with respect to the tire circumferential direction.

10. The pneumatic tire according to claim 1, wherein a minimum axial width of the crown land portion is 87% to 97% of a maximum axial width of the crown land portion.

11. The pneumatic tire according to claim 1, wherein the depths of the crown sipes are 80% to 100% of the depth of the center main groove.

12. The pneumatic tire according to claim 1, wherein centerlines of the first and second groove segments of the shallow crown circumferential groove are inclined at an angle with respect to the tire circumferential direction, and
wherein centerlines of zigzag segments of the center main groove are inclined at an angle with respect to the tire circumferential direction which angle is less than the angle of the shallow crown circumferential groove.

\* \* \* \* \*